United States Patent [19]
Yao et al.

[11] Patent Number: 5,485,414
[45] Date of Patent: Jan. 16, 1996

[54] DIVIDER CIRCUIT WHICH CALCULATES AN INTEGRAL QUOTIENT OF AN INTEGRAL DIVISOR

[75] Inventors: Mitsuyoshi Yao; Kohichi Ueda, both of Kawasaki, Japan

[73] Assignee: Fujitsu Limited, Japan

[21] Appl. No.: 214,315

[22] Filed: Mar. 17, 1994

[30] Foreign Application Priority Data

Jul. 2, 1993 [JP] Japan ................................. 5-164485

[51] Int. Cl.$^6$ ..................................... G06F 7/52
[52] U.S. Cl. ........................... 364/766; 364/761
[58] Field of Search ..................... 364/761, 764, 364/765, 766

[56] References Cited

U.S. PATENT DOCUMENTS

| | | | |
|---|---|---|---|
| 5,027,309 | 6/1991 | Koumoto et al. | 364/766 |
| 5,046,038 | 9/1991 | Briggs et al. | 364/765 |
| 5,047,973 | 9/1991 | Steiss et al. | 364/761 |
| 5,097,435 | 3/1992 | Takahashi | 364/766 |

*Primary Examiner*—Tan V. Mai
*Attorney, Agent, or Firm*—Staas & Halsey

[57] ABSTRACT

A divider circuit which calculates an integral quotient of an integral divisor and an integral dividend. A first multiplication unit calculates products of the integral divisor and all n-bit pattern values of an n-bit pattern, where n is a predetermined number and the n-bit pattern values respectively correspond to the calculated products. A calculation unit sets the integral dividend as an initial value of an operational integer, specifies a product among the products calculated by the first multiplication unit of which the subordinate n-bit value is equal to the subordinate n-bit value of the operational integer, and calculates a difference of the operational integer and the specified product. When the difference calculated by the calculation unit is not zero, an activation unit sets a new operational integer by canceling the subordinate n bits of the difference and causes the calculation unit to set the integral dividend, specify a product and calculate a difference based on the new operational integer. An output unit successively takes n-bit pattern values respectively corresponding to products specified by the calculation unit, and outputs these n-bit pattern values as the quotient when the difference calculated by the calculation unit is zero.

14 Claims, 8 Drawing Sheets

| PROSPECT QUOTIENT PARTS | | PROSPECT QUOTIENT PARTS × INTEGRAL DIVISOR $b_2$ | |
|---|---|---|---|
| DECIMAL SYSTEM | BINARY SCALE | DECIMAL SYSTEM | BINARY SCALE |
| 0 | 0000 | 0 | 0000 |
| 1 | 0001 | 23 | 1 0111 |
| 2 | 0010 | 46 | 10 1110 |
| 3 | 0011 | 69 | 100 0101 |
| 4 | 0100 | 92 | 101 1100 |
| 5 | 0101 | 115 | 111 0011 |
| 6 | 0110 | 138 | 1000 1010 |
| 7 | 0111 | 161 | 1010 0001 |
| 8 | 1000 | 184 | 1011 1000 |
| 9 | 1001 | 207 | 1100 1111 |
| 10 | 1010 | 230 | 1110 0110 |
| 11 | 1011 | 253 | 1111 1101 |
| 12 | 1100 | 276 | 1 0001 0100 |
| 13 | 1101 | 299 | 1 0010 1011 |
| 14 | 1110 | 322 | 1 0100 0010 |
| 15 | 1111 | 345 | 1 0101 1001 |

DIVIDER CIRCUIT WHICH CALCULATES AN INTEGRAL QUOTIENT OF AN INTEGRAL DIVISOR

BACKGROUND OF THE INVENTION

1. Field of the Invention

The present invention relates to a divider which calculates an integral quotient of an integral dividend and an integral divisor, more particularly to a divider which rapidly executes a division process which can be divided.

In various fields of data processing, it is desired to calculate an integral quotient of an integral dividend and an integral divisor. At a divider for calculating this division process, it is desired to rapidly execute this division process in order to increase the efficiency of the data processing.

2. Description of the Related Art

A usual divider calculates a quotient by a division process basically similar to a division process which is executed by a human. That is to say, the usual divider successively selects integers from superordinate bits of an integral dividend, evaluates the number of an integral divisor included in the selected integers, and obtains an integral quotient by repeating these processes.

However, according to the above division process, the selection and the evaluation must be done by trial and error. Therefore, the usual divider has a problem which increases the time to execute the division process, i.e., it cannot rapidly calculate the division process.

SUMMARY OF THE INVENTION

Therefore, the present invention has as its object the provision of a divider which can rapidly execute a division process of an integral dividend and an integral divisor which can be divided.

To achieve the above-mentioned object, the present invention constructs a divider by a multiplication means, a calculation means, an activation means, and an output means. The multiplication means calculates products of the integral divisor and all n-bit pattern values for forming prospect-quotient parts. The calculation means specifies a product of which a subordinate n-bit value is equal to a subordinate n-bit value of an operational integer among the products calculated by the multiplication means, and calculates the difference between the operational integer and the specified product. The activating means sets a new operational integer, and reactivates the calculation means. The output means creates an integral quotient depending on results specified by the calculation means.

In another aspect of the present invention, the above divider includes a setting means which is established in front of the divider, and sets a new integral dividend and a new integral divisor by modifying an integral dividend and an integral divisor.

In another aspect of the present invention, the divider is comprised of an extraction means, a first activation means, a subtraction means, a second activation means, and output means. The extraction means extracts a bit value from a lowest bit of an operational integer. The first activation means sets a new operational integer, and reactivates the extraction means. The subtraction means subtracts the integral divisor from the set operational integer. The second activation means sets a new operational integer, and reactivates the extracting means. The output means creates an integral quotient depending on results of the extraction means, and outputs the quotient.

DESCRIPTION OF THE PREFERRED EMBODIMENTS

A first embodiment of the present invention will be described with reference to the related figures.

Figure 1:
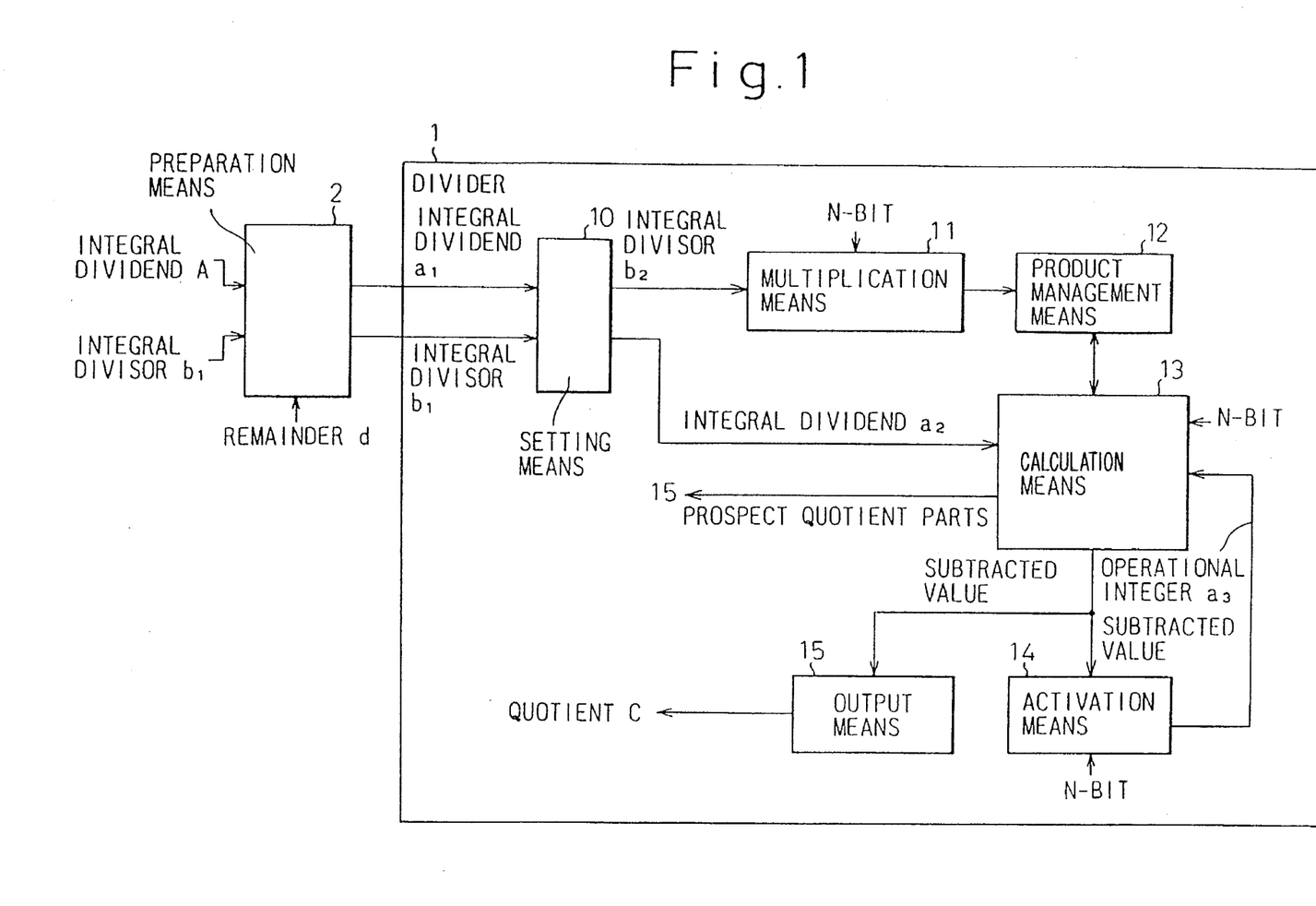
FIG. 1 is a block diagram showing a divider of a first embodiment of the present invention.

FIG. 1 is a block diagram showing a divider of the first embodiment of the present invention. In the figure, a divider 1 calculates an integral quotient c of an integral dividend $a_1$ and an integral divisor $b_1$ which can be divided. A preparation means 2 is established in front of the divider 1. The preparation means 2 calculates a remainder d of an integral dividend A and the integral divisor $b_1$, and changes the integral dividend A to the integral dividend $a_1$ by subtracting the remainder d from the integral dividend A. Therefore, it is assured the division that can be calculated. Detail of the preparation means 2 will be described hereinafter.

The divider 1 includes a setting means 10, a multiplication means 11, a product management means 12, a calculation means 13, an activation means 14, and an output means 15.

The setting means 10 cancels subordinate bits having a "0" value of the integral divisor $b_1$, sets the canceled integer divisor as a new integral divisor $b_2$ having a "1" value at a lowest bit, cancels subordinate bits of the integral dividend $a_1$ as many the number of the canceled bits of the integral divisor $b_1$, and sets the canceled integer dividend as a new integral dividend $a_2$. For example, when the integral divisor $b_1$ is "101000", three subordinate bits having "0" value are canceled, and remained superordinate bits "101" are set as the new integral divisor $b_2$. And three subordinate bits having "0" value of the integral dividend $a_1$ are canceled, and it is set as the new integral dividend $a_2$.

When the integral dividend $a_2$ and the integral divisor $b_2$ is set by the setting means 10, the multiplication means 11 calculates products of the integral divisor $b_2$ and all n-bit pattern values which forms prospect-quotient parts, and stores the products corresponding to each of prospect-quotient parts into the product management means 12. For example, in case of n=2, the products of "00"×$b_2$, "01"×$b_2$, "10"×$b_2$, and "11"×$b_2$ are calculated, and these products are stored into the product management means 12 corresponding to each "00", "01", "10", "11".

The calculation means 13 sets first the integral dividend $a_2$ as an initial value of an operational integer $a_3$, and specifies a product of which the subordinate n-bit value is equal to the subordinate n-bit value of the integral dividend $a_2$ among the products stored in the product management means 12, and also specifies a n-bit pattern which corresponds to the specified product among n-bit patterns stored in the product management means 12. Since "a÷b=c" can be modified to "c×b=a", and values of subordinate n bits of a product of the quotient c and the integral divisor $b_2$ are always equal to the subordinate n-bit value of the integral dividend $a_2$, the specified n-bit pattern value or the prospect-quotient part indicates a subordinate n-bit value of the quotient c.

The calculation means 13 calculates a difference by subtracting the specified product from the initial value $a_2$ of the operational integer $a_3$. That is to say, when "a÷b=c" is calculated, "a÷b=$c_1$+m" is obtained from the subordinate n-bit value m of the quotient c, and then the specified product (m×b) is subtracted from the integral dividend $a_2$ depending on the formula "(a−m×b)÷b=$c_1$".

The activation means 14 judges whether or not the difference calculated by the calculation means 13 is zero. When the difference is not zero, the activation means 14 cancels the subordinate n bits of the integral dividend $a_2$ (the initial value of the operational integer $a_3$) which have "0" value by the result of the subtracting by the calculation means 13, sets it as new operational integer $a_3$, and reactivates the calculation means 13.

The reactivated calculation means 13 specifies a product of which the subordinate n-bit value is equal to the subordinate n-bit value of the operational integer $a_3$ among the products stored in the product management means 12, also specifies a n-bit pattern value (or the prospect-quotient part) which corresponds to the specified product among the n-bit patterns stored in the product management means 12, and calculates a difference by subtracting the specified product from the operational value $a_3$. Then the activation means 14 judges again whether or not the difference calculated by the calculation means 13 is zero. When the difference is not "0", the activation means 14 cancels subordinate n bits having "0" value of the operation value $a_3$, sets the new value as a new operational integer $a_3$, and reactivates the calculation means 13.

By repeating the above process, the quotient c is obtained by successively taking the n-bit pattern values (or the prospect-quotient parts) from subordinate. At the end of the above process, the difference calculated by the calculation means 13 becomes zero. Then the activating means 14 activates the output means 15. The output means 15 outputs the quotient c by successively taking the obtained n-bit pattern values from subordinate, and the division process ends.

A detail of a division process of the divider 1 will be described with reference to FIG. 2.

Figure 2:
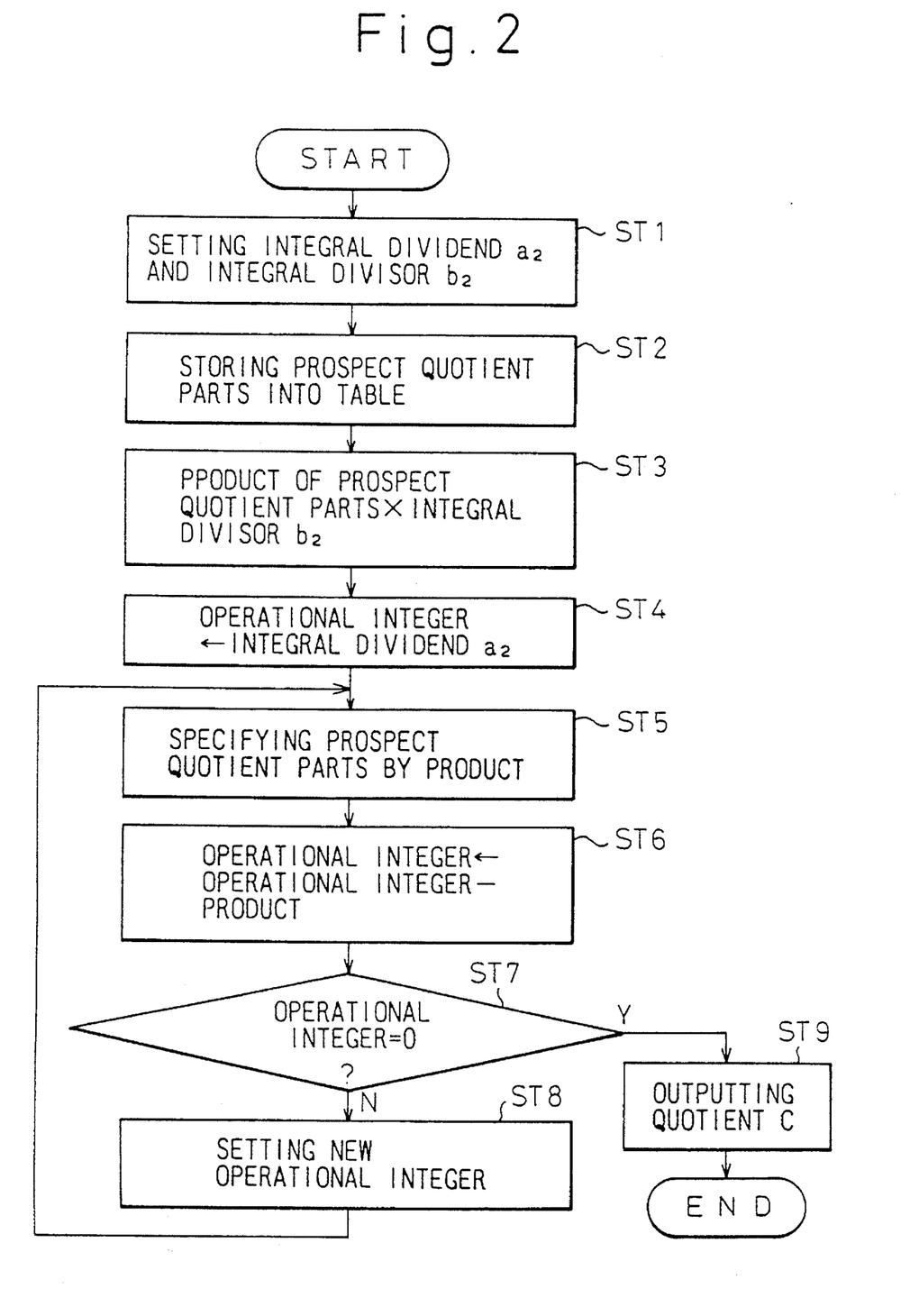
FIG. 2 is a flowchart showing an example of a process executed by the divider in FIG. 1.

FIG. 2 is a flowchart showing an example of the process executed by the divider 1. In the figure, when the divider 1 receives an integral dividend $a_1$ and an integral divisor $b_1$, the divider 1 starts a division process.

At a step 1, the setting means 10 cancels the subordinate bits having "0" value of the integral divisor $b_1$, sets the canceled integer divisor as a new integral divisor $b_2$ having a "1" value as a lowest bit, cancels as many subordinate bits of the integral dividend $a_1$ as the number of the canceled bits of the integral divisor $b_1$, and sets the canceled integer dividend as a new integral dividend $a_2$. That is to say, describing in the decimal system, a division formula "4000÷40" is modified to "400÷4".

Figure 3:
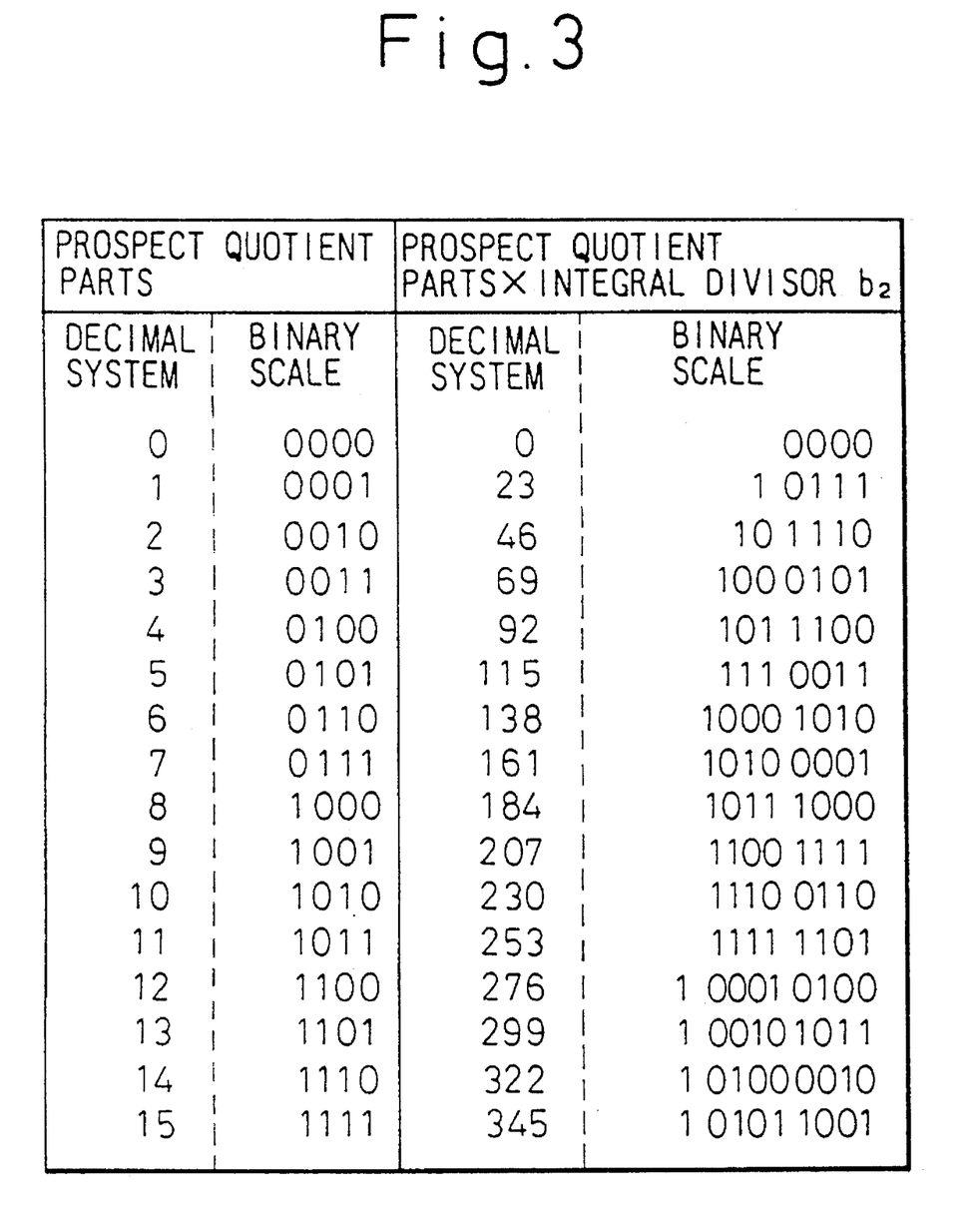
FIG. 3 shows table data used by the divider in FIG. 1.

At a step 2, the multiplication means 11 stores all n-bit pattern values of a predetermined n-bit into a table of the product management means 12. For example, in case of n=4, as shown in FIG. 3, sixteen n-bit pattern values of "0000" through "1111" are stored into the table. Each n-bit pattern value forms the prospect-quotient part.

At a step 3, the multiplication means 11 calculates products of all n-bit pattern values and the integral divisor $b_2$, and stores the products corresponding to the each prospect-quotient part into the table. In case of the integral divisor $b_2$=23, the products are stored as shown in FIG. 3.

At a step 4, the calculation means 13 sets the integral dividend $a_2$ as an initial value of variable "operational integer $a_3$".

At a step 5, a search means (not shown) of the calculation means 13 searches a product of which subordinate 4-bit value is equal to subordinate 4-bit value of the operational integer $a_3$ (integer $a_3$=$a_2$ at this time) among the products stored in the table, and specifies a prospect-quotient part which corresponds to the specified product. For example, in case of "$a_2$=48553 (= 1011 1101 1010 1001)", the product "1 0101 1001" is searched in the table, and a prospect-quotient part "1111" corresponding the product is specified. Since "$a_2$÷$b_2$=c" can be modified to "c×$b_2$=$a_2$" and a value of subordinate 4 bits of a product of the quotient c and the integral divisor $b_2$ is always equal to the subordinate 4-bit value of the integral dividend $a_2$, the specified prospect-quotient part indicates a subordinate 4-bit value of the quotient c.

At a step 6, a subtraction means (not shown) of the calculation means 13 calculates a difference by subtracting the product searched at the step 5 from the operational integer $a_3$. The activation means 14 sets the difference as new operational integer $a_3$. That is to say, at the division of "$a_2$÷$b_2$=c", since "$a_2$÷$b_2$=$c_1$+m" is obtained from the subordinate 4-bit value m of the quotient c, the specified product (m×$b_2$) is subtracted from the integral dividend $a_2$ depending on a formula "($a_2$−m×$b_2$)÷$b_2$=$c_1$". In above-mentioned case, the operational integer $a_3$ is renewed to "(1011 1101 1010 1001)−(1 0101 1001)=1011 1100 0101 0000".

At a step 7, the activation means 14 judges whether or not the new operational integer $a_3$ is zero. When the operational integer is not zero, the process advances to a step 8, and when the operational integer is zero, the process advances to a step 9.

At the step 8, the activation means 14 cancels the subordinate n bits having a "0" value for the operational integer $a_3$, and sets the canceled operational integer as a new operational integer $a_3$. In above-mentioned case, the new operational integer $a_3$ becomes "1011 1100 0101" and the process returns to the step 5. At the step 5, a product "100 0101" is searched for in the table, and a 4-bit value "0011" is specified as the succeeding 4 bits of the prospect-quotient part. At step 6, the operational integer $a_3$ is renewed "(1011 1100 0101)−(100 0101)=1011 1000 0000". At the step 8, the activation means 14 cancels the subordinate n bits having a "0" value for the operational integer $a_3$, and the operational integer $a_3$ is set "1011 1000". At the step 5, a product "1011 1000" is searched for in the table, and 4-bit value "1000" is specified as a succeeding 4 bits of the prospect-quotient part. At the step 6, the operational integer $a_3$ is renewed "(1011 1100)−(1011 1000)=0", and the process advances to a step 9 through the step 7.

At the step 9, the output means 15 outputs the quotient "1000 0011 1111" by successively taking the 4-bit pattern values "1111", "0011", "1000" from subordinate and the division process ends.

In above example, the calculation means 13 is composed of a search means and a subtracted means. However, the calculating means 13 can be composed of a subtraction means and a selecting means. The subtraction means calculates differences between the operational integer and each products calculated by the multiplication means 11, and the selecting means selects a difference showing a "0" value at all of the subordinate n bits among the differences calculated by the subtraction means, and outputs the selected difference.

Furthermore, the product management means 12 may only calculate the subordinate 4 bits of the products of the all n-bit pattern values and the integer divisor $b_2$. In this case, the calculation means 13 specifies a n-bit value corresponding to the subordinate n-bit value of the operational integer $a_3$ among the n-bit pattern values stored in the product management means 12. Also a second multiplication means is further established, which calculates a product of n-bit pattern values of the n bits specified by the calculated means 13 and the integer divisor $b_2$. The calculating means 13 calculates a difference between the operational integer $a_3$ and the product calculated by the second multiplied means.

Figure 4A:
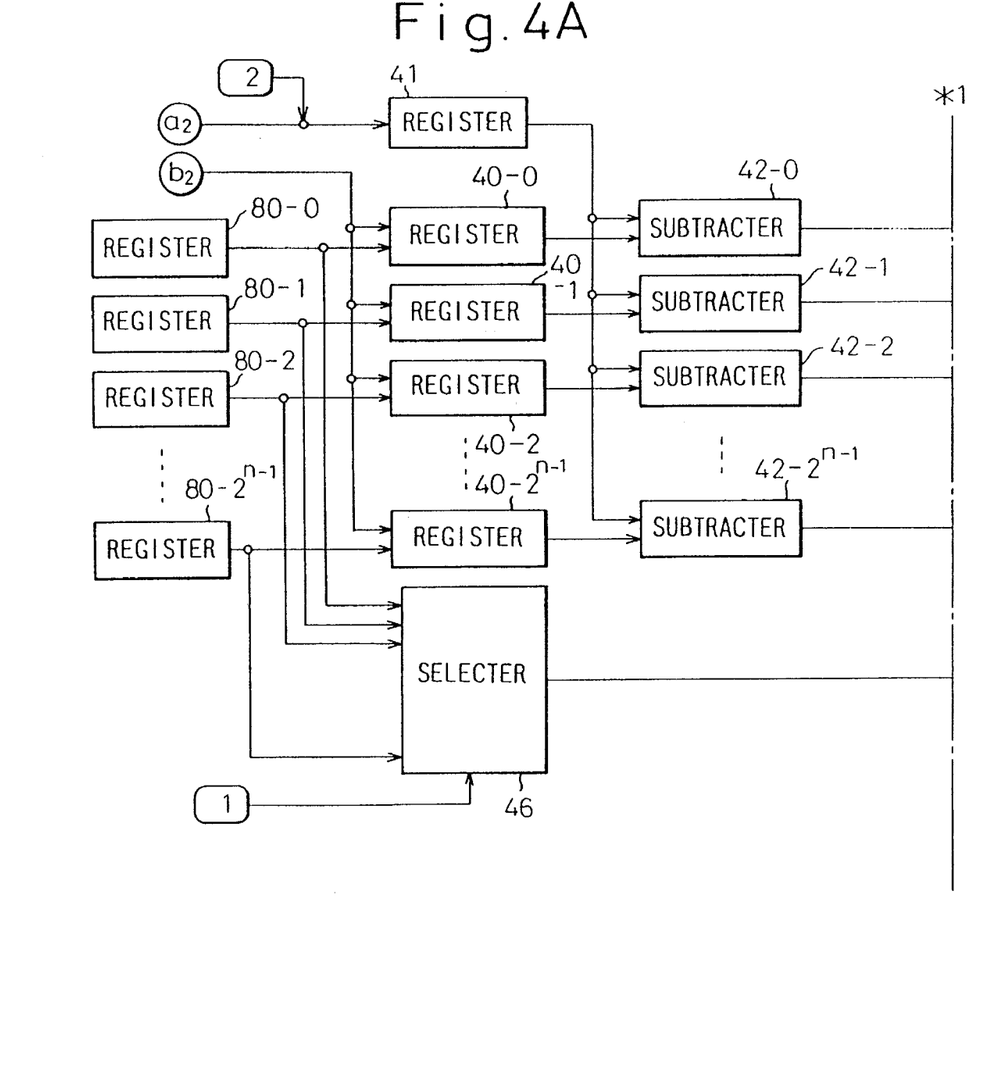
FIG. 4A and FIG. 4B show a more detailed circuit diagram of the divider in FIG. 1.
Figure 4B:
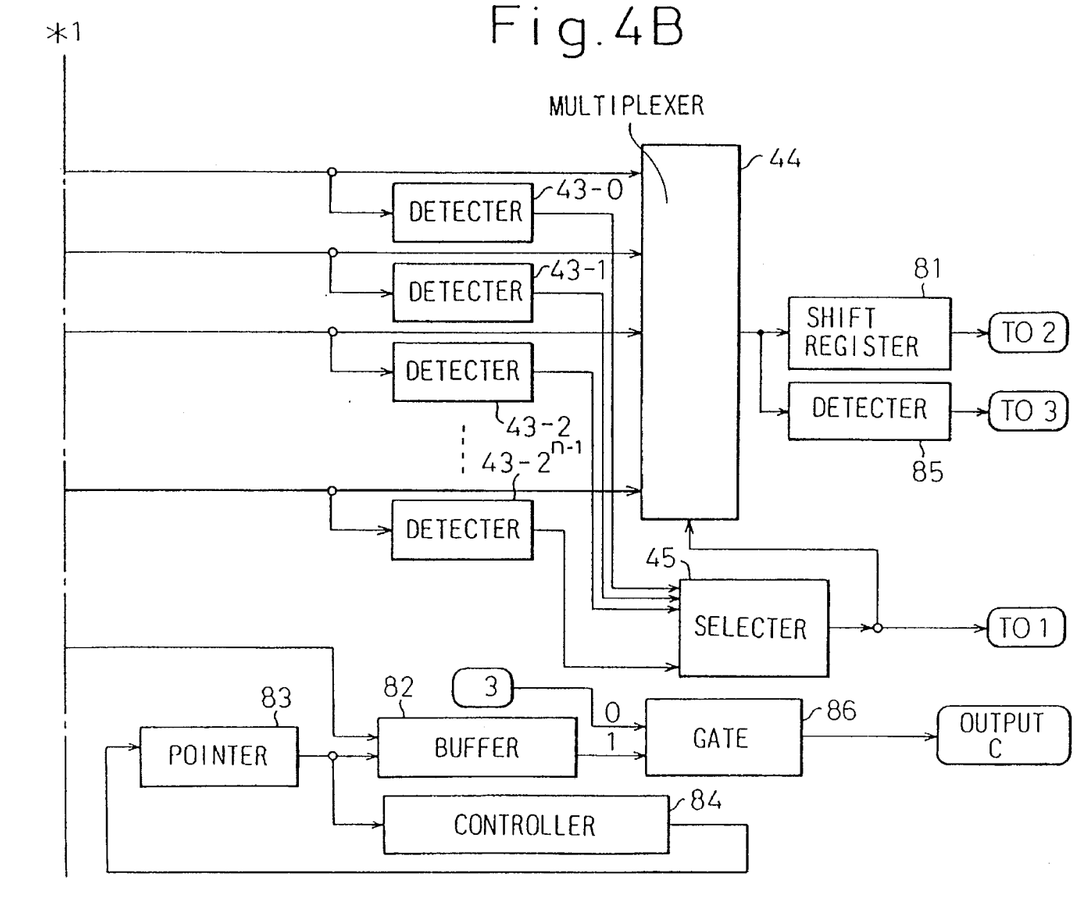

FIG. 4A and FIG. 4B show a more detailed circuit diagram of the embodiment of the present invention. In the figure, the integral dividend $a_2$ is input to a register 41 which stores the operational integer $a_3$. The integral divisor $b_2$ is input to registers 40-1 to 40-$2^{n-1}$. N-bit pattern values or the prospect-quotient parts stored in the register 80-0 to 80-$2^{n-1}$ are input to the registers 40-0 to 40-$2^{n-1}$. Each of registers 40-1 to 40-$2^{n-1}$ calculate the product of the integral divisor $b_2$ and the n-bit pattern value, and store each products therein. Each of subtracters 42-0 to 42-$2^{n-1}$ calculate the difference of the operational integer $a_3$ and the product, and output each of them into a multiplexer 44. One detector 43-i of detectors 43-0 to 43-$2^{n-1}$ detects an output which has a "0" value at all of the subordinate n bits among the output of the subtracters 42-0 to 42-$2^{n-1}$.

A selector 45 selects an output of the multiplexer 44 corresponding to the detector 43-i. A shift register 81 shifts the difference output from the multiplexer 44 to the right by n bits. So, the n-bits of the difference is canceled. The shifted difference is input to the register 41 as a new operational integer $a_3$.

The selector 45 also selects an output of a multiplexer 46 corresponding to the detector 43-i. The n-bit pattern value of the register 80-i is input to an output buffer 82 as a part of the prospect-quotient part. Then the n-bit pattern value or the prospect-quotient part is put in sequence in the output buffer 82 from subordinate by an output pointer 83 and a pointer controller 84.

When the difference output from the multiplexer 44 or the new operational integer $a_3$ is zero value, a detector 85 opens a gate 86, then the differences stored in the output buffer 82 are output as the integral quotient c.

Detail of an example of above-mentioned preparation means 2 will be now described with reference to the related figure.

The preparation means 2 makes first a remainder table of "$2^j$ (mod b)" as describing in a Japanese Unexamined Patent Publication (Kokai) No. 2-156329 (1990). In this formula, "b" means the integral divisor. If "x(mod y)=z", an equation "2·x(mod y)=2·z(mod y)" can be developed. Using this formula, the remainder table can be made by using a few calculation steps.

In case of "b=27" and "j=12", the remainder table is calculated as shown below by calculating "$2^0$(mod 27)" through "$2^{12}$(mod 27)".

$2^0$(mod 27)=1
$2^1$(mod 27)=1*2=2
$2^2$(mod 27)=2*2=4
$2^3$(mod 27)=4*2=8
$2^4$(mod 27)=8*2=16
$2^5$(mod 27)=16*2−27=5
$2^6$(mod 27)=5*2=10
$2^7$(mod 27)=10*2=20
$2^8$(mod 27)=20*2−27=13
$2^9$(mod 27)=13*2=26
$2^{10}$(mod 27)=26*2−27=25
$2^{11}$(mod 27)=25*2−27=23
$2^{12}$(mod 27)=23*2−27=19

Since the data of the remainder table changes periodically, when "x, y" of "$2^x$(mod z)=$2^y$(mod z)" are found in the table, a further calculation is not necessary, and following data can be found by repeating the data between x through y.

Figure 5:
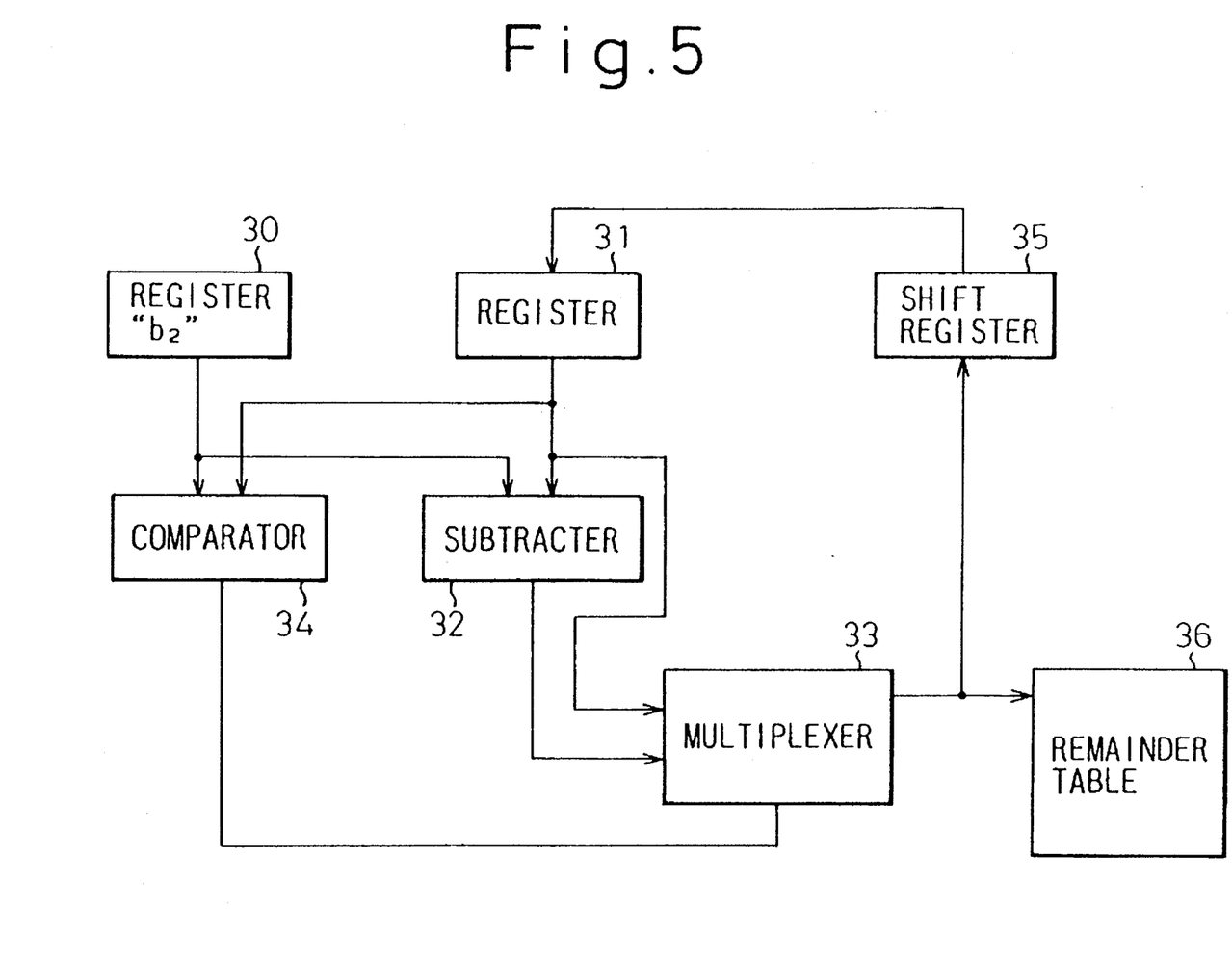
FIG. 5 is a block diagram for making a remainder table used by the divider in FIG. 1.

FIG. 5 shows an example of a block diagram for making the remainder table. This is composed of a register 30, a register 31, a subtracter 32, a multiplexer 33, a comparator 34, a shift register 35, and a remainder table 36. The register 30 stores the integral divisor $b_2$. The register 31 stores an integer of which an initial value is "1". The subtracter 32 calculates a difference between the stored value in the register 30 and the stored value in the register 31. The multiplexer 33 selects either of the stored value of the register 31 or the difference output of the subtracter 32. The comparator 34 compares the stored value in the register 30 and the stored value in the register 31, and selects the output of the multiplexer 33 to output the stored value of the register 31 when the stored value in the register 30 is greater than the stored value of the register 31, or to output the difference of the subtracter 32 when the stored value of the register 31 is greater than the stored value of the register 30. The shift register 35 doubles the output value of the multiplexer 33, and stores it to the register 31. The remainder table 36 stores the output values of the multiplexer.

After the remainder table is made by repeating above process, the preparation means 2 indicates the integral dividend A by the binary scale, and calculates an integral remainder d of a division "A÷b" referring the corresponding data in the remainder table.

For example, when the remainder d of the division "6757÷27" is calculated, "6757" is indicated as below.

$$6757=2^{12}+2^{11}+2^9+2^6+2^5+2^2+2^0$$

Therefore, the remainder d or "6757(mod 27)" is indicated as below.

$$6757(\text{mod } 27)=2^{12}(\text{mod } 27)+2^{11}(\text{mod } 27)+2^9(\text{mod } 27)+2^6(\text{mod } 27)+2^5(\text{mod } 27)+2^2(\text{mod } 27)+2^0(\text{mod } 27)$$

Referring the data of the remainder table, 6757(mod 27) is changed as below.

$$6757(\text{mod } 27)=(19+23+26+10+5+4+1)(\text{mod } 27)=7$$

After the remainder d is calculated "7", the preparation means 2 obtains the integral dividend $a_1$ by calculating "A−d", and changes "A÷$b_1$" which cannot be divided to "$a_1$÷$b_1$" which can be divided. Then, "$a_1$÷$b_1$" is input into the divider 1.

In the above divider 1, if the bit number n of the prospect-quotient part is "n=1", the product management means 12 stores only two products "0" (0×$b_2$) and "$b_2$" (1×$b_2$). When the lowest bit of the operational integer $a_3$ is "0", and a prospect-quotient part $a_3$ is specified as "0", the calculating means 13 outputs the operational integer as it is. On the other hand, when the lowest bit of the operational integer is "1", and the prospect-quotient part $a_3$ is specified as "1", the calculating means 13 outputs a difference which is the integral divisor $b_2$ subtracted from the operational integer $a_3$. The activation means 14 renews the operational integer $a_3$ by canceling the lowest bit of the output of the calculation means 13, and reactivates the calculating means 13.

Figure 6:
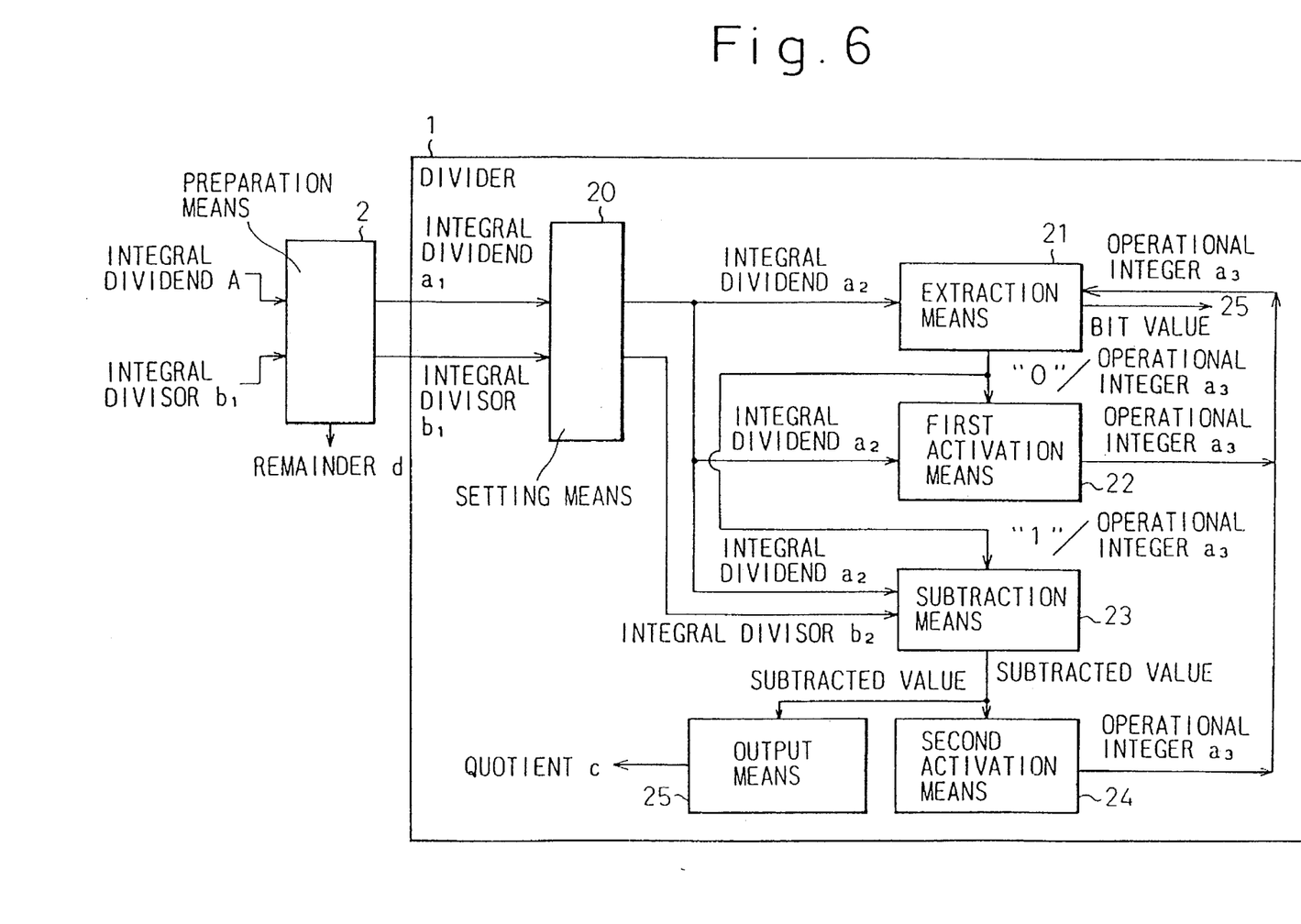
FIG. 6 is a block diagram showing a divider of second embodiment of the present invention.

FIG. 6 shows an another embodiment of the divider 1 of the present invention. In this embodiment, the bit number n of the prospect-quotient part is "n=1".

In the figure, the setting means 20, similar to the setting means 10 shown in FIG. 1, for making succeeding processes easy, cancels subordinate bits having "0" value of the integral divisor $b_1$, sets the canceled integer divisor as a new integral divisor $b_2$ having "1" value at a lowest bit, cancel as many of subordinate bits of the integral dividend $a_1$ as number of the canceled bits of the integral divisor $b_1$, and sets the canceled integer dividend as a new integral dividend $a_2$.

When the integral dividend $a_2$ and the integral divisor $b_2$ are set, an extraction means 21 first sets the integral dividend $a_2$ as an initial value of the operational integer $a_3$, and extracts a lowest bit of an integral dividend $a_2$. When the extracted bit value is "0", the first activation means 22 sets a new operational integer $a_3$ by canceling the lowest bit of the integral dividend $a_2$, and reactivates the extraction means 21.

To the contrary, when the extracted bit value is "1", a subtraction means 23 calculates a difference by subtracting the integral divisor $b_2$ from the operational integer $a_3$. A second activation means 24 judges whether or not the difference is "0". When the difference is not "0", the second activation means 24 sets a new operational integer $a_3$ by canceling the lowest bit of the difference, and reactivates the extraction means 21.

The reactivated extraction means 21 extracts a lowest bit of the new operational integer. When the extracted bit value is "0", the first activation means 22 sets a new operational integer $a_3$ by canceling the lowest bit of the integral dividend $a_2$, and reactivates the extraction means 21.

To the contrary, when the extracted bit value is "1", the subtraction means 23 calculates a difference of the integral divisor $b_2$ and the operational integer $a_3$. The second activation means 24 sets a new operational integer by canceling the lowest bit of the difference, and reactivates the extraction means 21.

While repeating these process, an output means 25 stores the "0/1" bit value extracted by the extraction means 21 by successively taking this value from subordinate. When the difference calculated by the subtracted means 23 becomes "0", the output means 25 outputs these values as the quotient c.

Next, a detail of the division process of the above divider 1 will be described with reference to FIG. 7.

Figure 7:
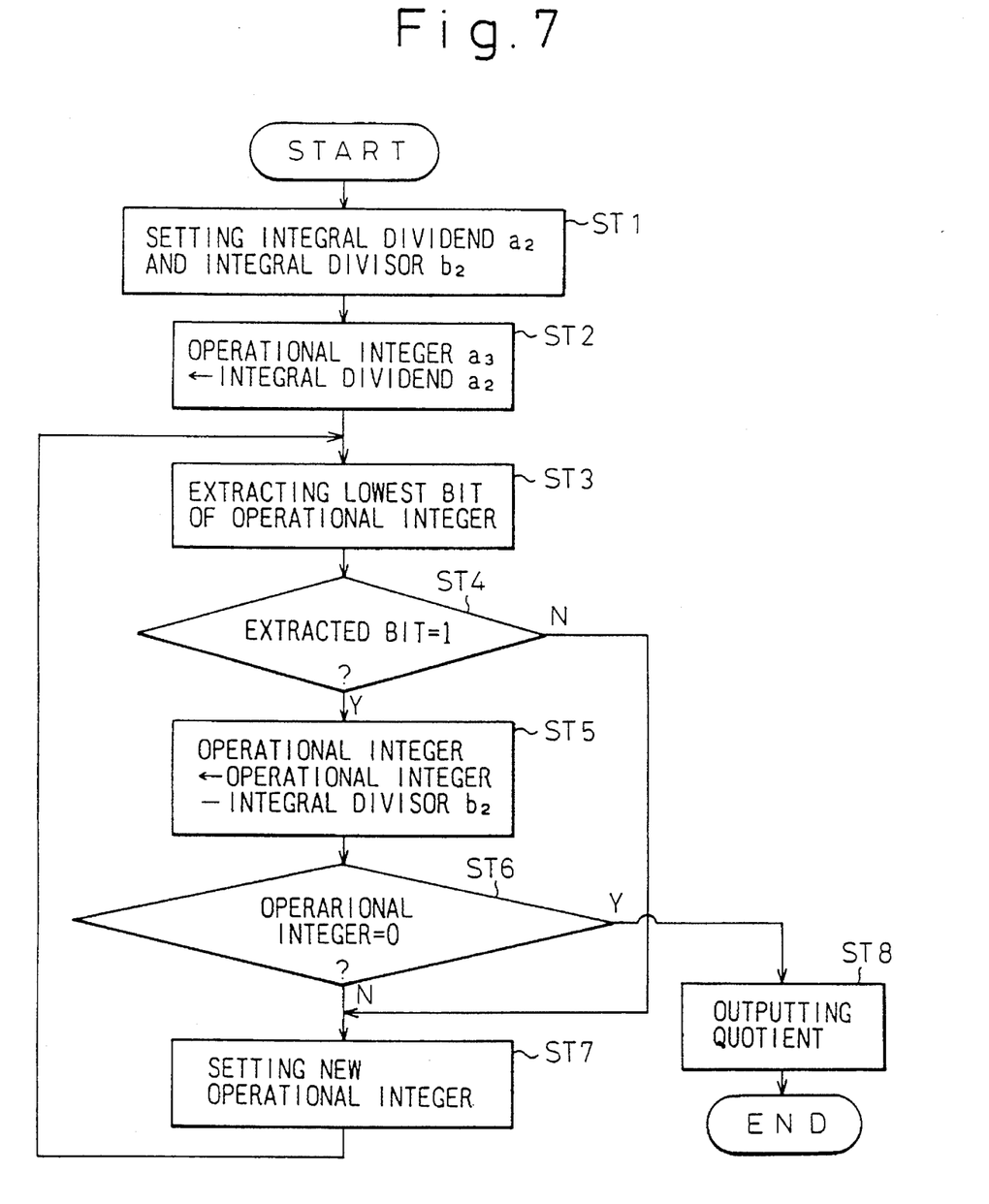
FIG. 7 is a flowchart showing an example of the process executed by the divider in FIG. 6.

FIG. 7 is a flowchart showing an example of a division process executed by the divider 1 in FIG. 6. In FIG. 7, when the divider 1 receives an integral dividend $a_1$ and an integral divisor $b_1$, the divider 1 starts the division process.

At a step 1, the setting means 21 cancels subordinate bits having a "0" value of an integral divisor $b_1$, sets the canceled integer divisor as a new integral divisor $b_2$ having a "1" value at the lowest bit, cancels as many subordinate bits of an integral dividend $a_1$ as the number of the canceled bits of the integral divisor $b_1$, and sets the canceled integer dividend as a new integral dividend $a_2$.

At a step 2, the extraction means 21 sets the integral dividend $a_2$ as an initial value of the operational integer $a_3$.

At a step 3, the extraction means 21 extracts a lowest bit value of the operational integer $a_3$ ($a_3=a_2$ at this time).

At a step 4, it is judged whether or not the extracted bit value is "1". At first time, the lowest bit of the integral divisor $b_2$ shows "1" value, so the lowest bit of the extracted bit value. It means that the lowest bit of the quotient c becomes "1", and the process advances to a step 5.

At step 5, the subtraction means 23 calculates a difference by subtracting the integral divisor $b_2$ from the operational integer $a_3$, and the second activation means 24 sets the difference as the new operational integar $a_3$. That is to say, at the division of "$a_2 \div b_2 = c$", since "$a_2 \div b_2 = c_1 + 1$" is obtained from the lowest bit value "1" of the quotient c, the integral divisor $b_2$ ($= 1 \times b_2$) is subtracted from the integral dividend $a_2$ depending on a formula "$(a_2 - 1 \times b_2) \div b_2 = c_1$".

At a step 6, it is judged whether or not the operational integer $a_3$ is "0". When it is not "0", theprocess advances to a step 7, and when it is "0", the process advances to a step 8.

At the step 7, the second activation means 24 sets new operational integer by canceling the lowest bit of the operational integer $a_3$. After that, the process returns to the step 3.

In case of the extracted bit value being "0" value at the step 4, the process skips the step 5 and the step 6, and advances immediately to the step 7.

At the step 7, the first activation means 21 cancels the lowest bit of the operational integer $a_3$, and sets it as a new operational integer $a_3$. And the process advances to the step 3.

When the operational integer $a_3$ is "0" at the step 6, the process advances to a step 8. At the step 8, the output means 25 outputs the quotient c by successively taking the bit values extracted at the step 3 from subordinate.

For example, the division "6750 (=1 1010 0101 1110)÷27 (= 1 1011)" is executed as following by above division process.

First, the integral dividend $a_2$ "1 1010 0101 1110" is set as an initial value of the operational integer $a_3$. Since the lowest bit of the operational integer $a_3$ "1 1010 0101 1110" is "0", the first prospect-quotient parts becomes "0", and the new operational integer $a_3$ is set "1101 0010 1111" by canceling the lowest bit thereof.

Next, since the lowest bit of the operational integer $a_3$ "1101 0010 1111" is "1", a following prospect-quotient part becomes "1", the difference becomes "1101 0001 0100" (= 1101 0010 111-1 1011), and the operational integer $a_3$ is set "110 1000 1010" by canceling the lowest difference bit.

Next, since the lowest bit of the operational integer $a_3$ "110 1000 1010" is "0", a following prospect-quotient part becomes "0", the new operational integer $a_3$ is set "11 0100 0101" by canceling the lowest bit thereof.

Next, since the lowest bit of the operational integer $a_3$ "11 0100 0101" is "1", a following prospect-quotient part becomes "1", the difference becomes "11 0010 1010" (= 11 0100 0101-1 1011), and the operational integer $a_3$ is set "1 1001 0101" by canceling the lowest difference bit.

Next, since the lowest bit of the operational integer $a_3$ "1 1001 0101" is "1", a following prospect-quotient part becomes "1", the difference becomes "1 0111 1010" (= 1 1001 0101-1 1011), and the operational integer $a_3$ is set "1011 1101" by canceling the lowest difference bit.

Next, since the lowest bit of the operational integer $a_3$ "1011 1101" is "1", a following prospect-quotient part becomes "1", the difference becomes "1010 0010" (= 1011 1101-1 1011), and the operational integer $a_3$ is set "101 0001" by canceling the lowest difference bit.

Next, since the lowest bit of the operational integer $a_3$ "101 0001" is "1", a following prospect-quotient part becomes "1", the difference becomes "11 0110" (= 101 0001-1 1011), and the operational integer $a_3$ is set "1 1011" by canceling the lowest difference bit.

Finally, since the lowest bit of the operational integer $a_3$ "1 1011" is "1", a last prospect-quotient part becomes "1", the difference becomes "0" (= 1 1011-1 1011), and this division process ends and the quotient c becomes "111 1010".

We claim:

1. A divider which calculates an integral quotient of an integral divisor and an integral dividend, the divider comprising:

a first multiplication unit which calculates products of the integral divisor and all n-bit pattern values of an n-bit pattern, where n is a predetermined number, the n-bit pattern values respectively corresponding to the calculated products;

a calculation unit which sets the integral dividend as an initial value of an operational integer, specifies a product among the products calculated by the first multiplication unit of which the subordinate n-bit value is equal to the subordinate n-bit value of the operational integer, and calculates a difference of the operational integer and the specified product;

an activation unit which, when the difference calculated by the calculation unit is not zero, sets a new operational integer by canceling the subordinate n bits of the difference and causes the calculation unit to set the integral dividend, specify a product and calculate a difference based on the new operational integer; and an output unit which successively takes n-bit pattern values respectively corresponding to products specified by the calculation unit, and outputs these n-bit pattern values as the quotient when the difference calculated by the calculation unit is zero.

2. A divider according to claim 1, wherein the calculation unit comprises:

a search unit which searches for a product of which the subordinate n bits are equal to the subordinate n bits of the operational integer among the products calculated by the first multiplication unit; and a subtraction unit which calculates a difference of the operational integer and the product searched by the search unit.

3. A divider according to claim 1, wherein the calculation unit comprises:

a subtraction unit which calculates a difference between the operational integer and each of the products calculated by the first multiplication unit, and a selection unit which selects a difference showing "0" value at all the subordinate n-bit values among the differences calculated by the subtraction unit.

4. A divider according to claim 1, wherein:

the first multiplication unit calculates subordinate n-bit values of products of the integral divisor and all n-bit pattern values; and the calculation unit specifies an n-bit value which is equal to a subordinate n-bit value of an operational integer among the n-bit pattern values calculated by the first multiplication unit;

a second multiplication unit calculates a product of the integral divisor and the n-bit pattern value corresponding to the n-bit values specified by the calculation unit; and the calculation unit calculates the difference between the operational integer and the product calculated by the second multiplication unit.

5. A divider according to claim 1, further comprising:

a preparation unit which receives an integral dividend and an integral divisor which produce a remainder when the integral dividend is divided by the integral divisor, calculates a remainder of the division of the integral dividend and the integral divisor, and sets a new integral dividend by subtracting the remainder from the integral dividend.

6. A divider which calculates an integral quotient of an integral divisor and an integral dividend, the divider comprising:

a setting unit which receives the integral divisor and the integral dividend, sets a new integral divisor having "1" value at a lowest bit by canceling "0" value subordinate bits of the integral divisor, and sets a new integral dividend by canceling as many "0" value subordinate bits of the integral dividend as were canceled in the integral divisor;

a first multiplication unit which calculates products of the integral divisor set by the setting unit and all n-bit pattern values of an n-bit pattern, where n is a predetermined number, the n-bit pattern values respectively corresponding to the calculated products;

a calculation unit which sets the integral dividend set by the setting unit as an initial value of an operational integer, specifies a product among the products calculated by the first multiplication unit of which the subordinate n-bit value is equal to the subordinate n-bit value of the operational integer, and calculates a difference between the operational integer and the specified product;

an activation unit which, when the difference calculated by the calculation unit is not zero, sets a new operational integer by canceling the subordinate n bits of the difference and causes the calculation unit to set the integral dividend, specify a product and calculate a difference based on the new operational integer; and an output unit which successively takes n-bit pattern values respectively corresponding to products specified by the calculation unit, and outputs these n-bit pattern values as the quotient when the difference calculated by the calculation unit is zero.

7. A divider according to claim 6, wherein the calculation unit comprises:

a search unit which searches for a product of which the subordinate n bits are equal to the subordinate n bits of the operational integer among the products calculated by the first multiplication unit; and a subtraction unit which calculates a difference of the operational integer and the product searched by the search unit.

8. A divider according to claim 6, wherein the calculation unit comprises:

a subtraction unit which calculates a difference of the operational integer and each of the products calculated by the first multiplication unit, and a selection unit which selects a difference showing "0" value at all subordinate n-bit values among the differences calculated by the subtraction unit.

9. A divider according to claim 6, wherein:

the first multiplication unit calculates subordinate n-bit values of products of the integral divisor set by the setting unit and all n-bit pattern values; and the calculation unit specifies an n-bit value which is equal to a subordinate n-bit value of an operational integer among the n-bit pattern values calculated by the first multiplication unit, the divider further comprising a second multiplication unit calculates a product of the integral divisor and the n-bit pattern value corresponding to the n-bit values specified by the calculation unit where the calculation unit calculates a difference of the operational integer and the product calculated by the second multiplication unit.

10. A divider according to claim 6, further comprising:

a preparation unit which receives an integral dividend and an integral divisor which produce a remainder when the integral dividend is divided by the integral divisor, calculates a remainder of the division of the integral dividend and the integral divisor, sets a new integral dividend by subtracting the remainder from the integral dividend, and provides the new integral dividend to the setting unit as the integral dividend.

11. A divider which calculates an integral quotient of an integral divisor and an integral dividend, the divider comprising:

an extraction unit which sets the integral dividend as an initial value of an operational integer, and extracts a bit value from a lowest bit of the integral dividend;

a first activation unit which sets a new operational integer by canceling a lowest bit of the operational integer when the extracted bit value extracted by the extraction unit is "0", and causes the extraction unit to set the integral dividend and extract a bit value based on the new operational integer;

a subtraction unit which calculates a difference by subtracting the integral divisor from the operational integer when the extracted bit value is "1";

a second activation unit which sets a new operational integer by canceling a lowest bit of the difference calculated by the subtraction unit when the difference calculated by the subtraction unit is not zero, and causes the extraction unit to set the integral dividend and extract a bit value based on the new operational integer; and an output unit which the successively takes the bit value extracted by the extraction unit, and outputs these n-bit values as the integral quotient when the difference calculated by the subtraction unit is zero.

12. A divider according to claim 11, further comprising:

a preparation unit which receives an integral dividend and an integral divisor which produce a remainder when the integral dividend is divided by the integral divisor, calculates a remainder of the division of the integral dividend and the integral divisor, and sets a new integral dividend by subtracting the remainder from the integral dividend.

13. A divider which calculates an integral quotient of an integral divisor and an integral dividend, the divider comprising:

a setting unit which receives the integral divisor and the integral dividend, sets a new integral divisor having "1" value at a lowest bit by canceling "0" value subordinate bits of the integral divisor, and sets a new integral dividend by canceling as many "0" value subordinate bits of the integral dividend as were canceled in the integral divisor;

an extraction unit which sets the integral dividend set by the setting unit as an initial value of an operational integer, and extracts a bit value from the lowest bit of the integral dividend;

a first activation unit which sets a new operational integer by canceling the lowest bit of the operational integer when the extracted bit value extracted by the extraction unit is "0", and causes the extraction unit to set the integral dividend and extract a bit value based on the new operational integer;

a subtraction unit which calculates a difference by subtracting the integral divisor set by the setting unit from the operational integer when the extracted bit value extracted by the extraction unit is "1";

a second activation unit which sets a new operational integer by canceling the lowest bit of the difference calculated by the subtraction unit when the difference calculated by the subtraction unit is not zero, and causes the extraction unit to set the integral dividend and extract a bit value based on the new operational integer; and an output unit which successively takes the bit values extracted by the extraction unit, and outputs these n-bit values as the integral quotient when the difference calculated by the subtraction unit is zero.

14. A divider according to claim 13, further comprising:

a preparation unit which receives an integral dividend and an integral divisor which produce a remainder when the integral dividend is divided by the integral divisor, calculates a remainder of the division of the integral dividend and the integral divisor, sets a new integral dividend by subtracting the remainder from the integral dividend, and provides the new integral dividend to the setting unit as the integral dividend.

* * * * *

UNITED STATES PATENT AND TRADEMARK OFFICE
CERTIFICATE OF CORRECTION

PATENT NO. : 5,485,414
DATED : January 16, 1996
INVENTOR(S) : Mitsuyoshi YAO

It is certified that error appears in the above-indentified patent and that said Letters Patent is hereby corrected as shown below:

```
Column 3, line 3, delete "a+b=c" and insert therefor --a÷b=c--.
 Column 7, line 8, delete "an";
     *Line 47, delete "process" and insert therefor --processes,--.
 Column 8, line 16, delete "theprocess" and insert therefor
          --the process--.
 Column 11, line 43, delete "the", first occurrence.
```

Signed and Sealed this

Ninth Day of April, 1996

Attest:

BRUCE LEHMAN

Attesting Officer

Commissioner of Patents and Trademarks